United States Patent [19]

Houk

[11] Patent Number: 4,571,873

[45] Date of Patent: Feb. 25, 1986

[54] BLACK POWDER MEASURING DEVICE THE PRO-CHARGER

[76] Inventor: Stanley M. Houk, 3014 Chancery Ct., Rapid City, S. Dak. 57702

[21] Appl. No.: 487,042

[22] Filed: Apr. 21, 1983

[51] Int. Cl.[4] ............................................. F41C 27/00
[52] U.S. Cl. ....................................... 42/90; 222/158; 222/449; 222/559
[58] Field of Search ..................... 42/90; 222/158, 449, 222/559

[56] References Cited

U.S. PATENT DOCUMENTS 4,112,606 9/1978 Griffin ....................................... 42/90
4,442,620 4/1984 Drake et al. ............................. 42/90

Primary Examiner—Charles T. Jordan

[57] ABSTRACT

A black powder measuring, transporting, and dispensing device which includes a cylindrical open ended body to receive and dispense powder for use in muzzle loading firearms. The device has an elongated body with a larger top opening and a powder cavity to receive and hold powder, which tapers to a narrower dispensing end so as to funnel a charge of powder into the muzzle of varied caliber firearms including rifles, pistols, and shotguns, and is constructed of brass. Encased in the body, and having graduated powder quantity indicators, is a transparent scale viewer for measuring and viewing contained powder. The scale viewer is constructed of high impact synthetic material. A spring energized plunger rod controls the dispensing of the powder charge contained within the device.

9 Claims, 4 Drawing Figures

BLACK POWDER MEASURING DEVICE THE PRO-CHARGER

BACKGROUND OF THE INVENTION

1. Field of the Invention

It is the formidable object of this invention to collectively identify with what pertains to muzzle loading firearms with emphasis on a device designed to measure, transport, and dispense powder as used in the art of muzzle loading firearms such as rifles, pistols, and shotguns.

2. Reference to Prior Art

While keeping in the tradition of the art and sport of muzzle loading firearms such as rifles, it is necessary to employ certain appendages for complete exercise of the process which therewith requires a sequence of steps. Having first readied the firearm, it is there that a device used to measure, and then pour powder into the firearm muzzle, hence a cloth patch dressed with a compression sealer is placed with sealer side down upon the muzzle, together with a projectile atop the cloth patch and forced into the muzzle with a ball starter, and continually through the barrel with a ram rod to the breech. Thus complete, a percusion cap is then placed on the nipple concluding the process. It is therefore necessary to have on hand a measuring device, a quantity of powder, sealer, patches, projectiles, and percusion caps.

Thereabove, with reference to such measuring devices appertaining thereto, as can be cited in U.S. Pat. No. 4,112,606 to Griffin, which attempts to automate said process thus destroying the authentic concept of muzzle loading with which said device provides that a single device is so constructed with multiple compartments for carrying powder, projectiles, and percusion caps which therein concludes that simplicity in construction; which is not obvious therewith, is unquestionably of the first importance; in order that those who are to use them may readily comprehend their principles and utilities.

Additional examination of prior related art as there granted in United States Patent to Wilburn; U.S. Pat. No. 3,775,889 relevant to application and construction, nothing appears to be complicated, on the contrary, the only merit which consists therewith, is a method of multiple application which may not always be mechanically dependable or safe to use which will perplex the operator and cause more than common attention thereto, and if perchance it fail in operation, which is complexity of construction would necessarily occasion, one looses all confidence in its power of execution.

And, while devices of prior related art require an adjustment to measure powder which may be accomplished by loosening a set screw or ring which then allows a scale or sleeve to be manually corrected and set according to a particular desired amount therealong to an exterior or interior granular mark.

And, while devices of prior related art invariably have no effective method of use to prevent excessive powder loss due to wind, nervousness, and lack of experience caused by the necessity of pouring powder from a flask filling said device to the open top resulting in overflow, hence pouring the contained powder from said device into the firearm muzzle causing further loss. And, while devices of prior related art as referenced hereabove will occasion an adjustment, have no effective method to prevent powder loss, and complexity of construction will there combined cause more than reasonable time of execution.

Teachings of prior related art have made available many areas of improvements, of which have been implemented into functional use which is the objective of this invention and will therefore distinguish it from that which has been determined as old. Further research and use has revealed that practical field use of devices of prior related art with reference to safty, convenience, and mechanical dependability uniquely characterizes this invention.

SUMMARY OF THE INVENTION

Therefore, it is the object of this invention to obviate all of the aforementioned disadvantages by providing a muzzle loading measuring, transporting and dispensing device for the single purpose of priming muzzle loading firearms thereby greatly limiting unfavorable results.

The continual purpose of this invention is to design and construct a muzzle loading measuring, transporting, and dispensing device of a cylindrical open ended body to receive powder of a particular predetermined amount without adjustment; transport powder without spillage; and dispense powder efficiently.

A constant purpose of this invention where enjoined to the body is a transparent scale viewer for measuring and viewing contained powder, and therealong having graduated powder quantity indicators to exact an expressly desired amount of powder for a specific firearm.

Another purpose of this invention is the quick and efficient accuracy of receiving and dispensing powder from an amount of more or less than a previous amount as may be determined by a particular caliber firearm without having to adjust a scale.

Yet another purpose of this invention is the embodiment of a nipple pick for the occasional removal of spent powder or soot from the throat of the nipple of the firearm to assure proper percusion cap explosion and effective powder ignition.

An additional purpose of this invention is the conversion of the body into a funnel while from time to time when necessary to replenish a powder supply such as in a flask, designed to insert the funnel end into the pour spout opening in the base of a powder flask for such use.

Still another purpose of this invention is the dispensing end of the body being of such design to unite with varied caliber firearm muzzle bores such as rifles, pistols, and shotguns.

Additional advantages and purpose of this invention will be further defined within the ensuing description of the preferred embodiment and referenced by the accompanying drawings.

DESCRIPTION OF THE PREFERRED EMBODIMENT

Figure 1:
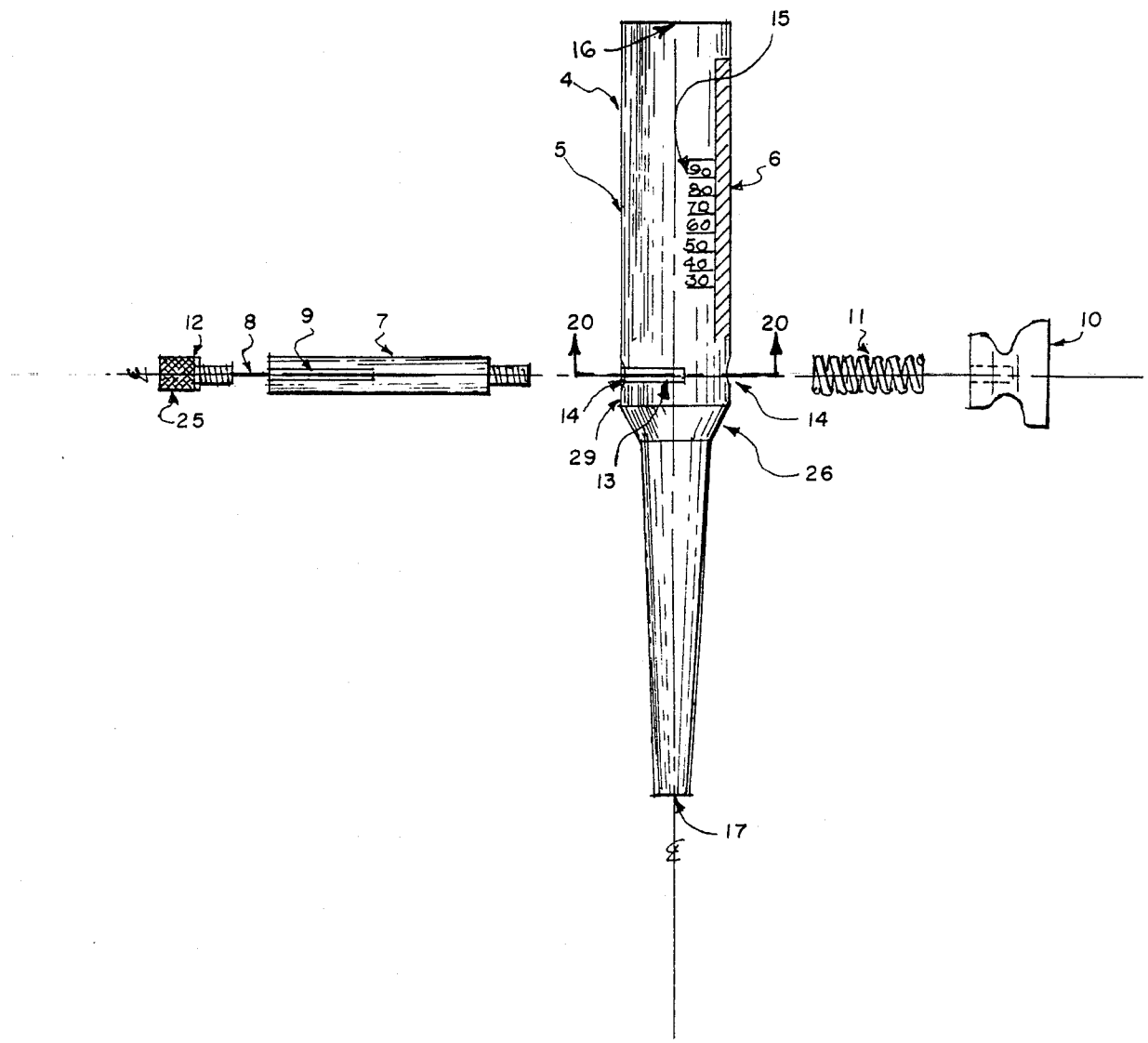
FIG. 1 is an exploded view of the muzzle loading measuring, transporting, and dispensing device.
Figure 2:
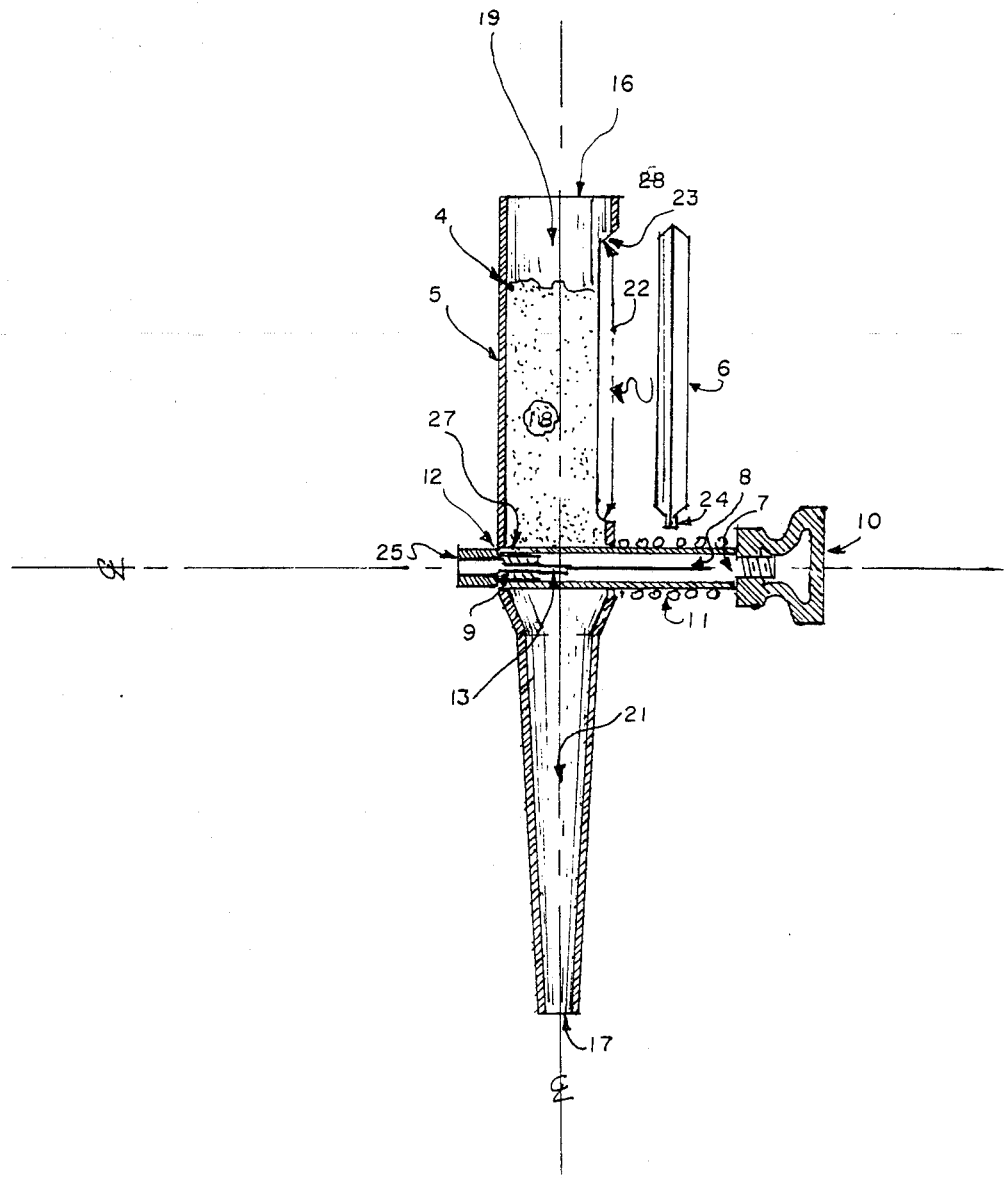
FIG. 2 is a sectional view of the dispensing device.
Figure 3:
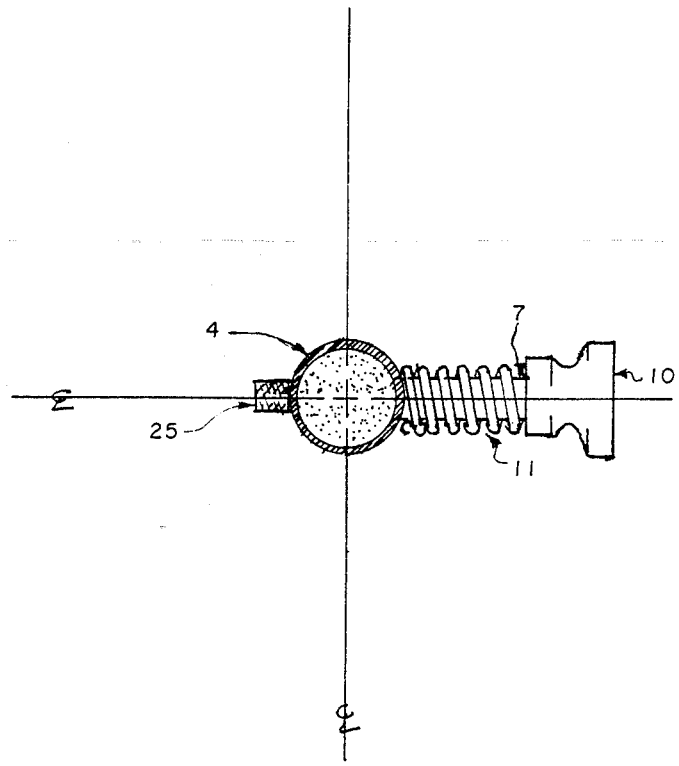
FIG. 3 is a sectional view of the dispensing device as viewed in the direction of arrows 20—20 of FIG. 1.
Figure 4:
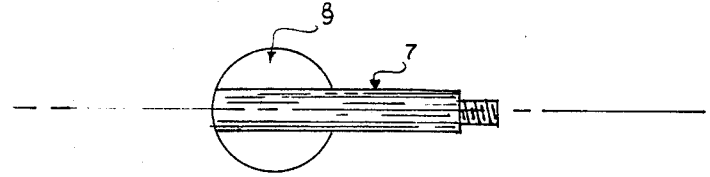
FIG. 4 is a top view of the plunger rod.

This invention, a muzzle loading measuring, transporting and dispensing device, being graphically symbolic of FIGS. 1,2,3, and 4, includes a cylindrical open ended body (5), transparent scale viewer (6), plunger rod (7), nipple pick (8), carriage (9), plunger rod thumb screw (10), stainless steel spring (11), and a leather grommet (12) as component parts. The body (5) is of a contiguous contour, varying in degree of circumference being widest at the receiving end (16) thence tapering to the narrower dispensing end (17). Beginning from the most upper graduated powder indicator (15) of the receiving end (16) of the body (5) and there through to the top of the carriage (9) defines the powder cavity (19). There within the body (5) beginning from atop the carriage (9) which terminates the powder cavity (19) to the most upper graduated powder quantity indicator (15) defines said indicators. Begining from the dispensing end (17) extending upward toward the under side of the carriage (9) defines the passage chamber. The cylindrical body wall (28) terminates adjacent the transparent scale viewer (6) where therealong extends a vertical opening forming a cradle (22) to embody a transparent scale viewer (6) with concave notches (23) present on both ends of the cradle (22) opening inside top center and inside lower center to receive the convex extremities (24) present on both ends of the transparent scale viewer (6). The body (5) also embraces a plunger rod (7) which is a mobile appendage of the present invention (4) which requires a set of guideholes (14) present on both sides of the body (5) in a direct horizontal alinement. The plunger rod guidehole (14) serves as an escort for the plunger rod (7) projection; while the carriage guide (13) supports the outward movement of the carriage (9) when the plunger rod (7) is set into motion to dispense contained powder (18). The plunger rod (7) is of multiple use and design, it embodies the carriage (9) which is in circumference less than the inside circumference of the body (5) and while said carriage (9) is in the closed position, FIG. (2), said carriage (9) will support contained powder (18) until set into motion by depressing the elongated closed end of the plunger rod (7) causing the carriage (9) to egress along and through the carriage guide (13) while the inner body wall (27) serves as a back stop causing the contained powder (18) to drop from the carriage (9) through the passage chamber (21) and out the dispensing end (17). The nipple pick (8) is there mounted inside the open end of the plunger rod (7) adjacent the carriage (9) and there secured within said plunger rod (7) by the threaded extremity of the nipple pick thumb screw (25) and there retained with a leather grommet (12). The plunger rod (7) being therefore defined, is enjoined to the body (5) by and through the plunger rod guidehole (14), retained and secured while extending outward from the body (5) adjacent the transparent scale viewer (6) by a stainless steel spring (11) for retractional energy, while the plunger rod (7) is readily threaded therealong the closed end of the plunger rod (7) to receive said spring (11) and thumb screw (10) thus terminating the plunger rod (7) extension. The cylindrical open ended body (5), plunger rod (7), carriage (9), and nipple pick thumb screw (25), are constructed of rigid brass, while the nipple pick (8) and spring (11) are constructed of stainless steel, and the transparent scale viewer (6) is constructed of a high impact synthetic marterial. The durable nature of these materials will assure repetive use without fear of structural or mechanical breakdown and therefore permits the operator to access greater confidence.

While in use, the contained powder (18) transported by this muzzle loading measuring, transporting, and dispensing device is measured therealong by graduated powder qunatity indicators (15) as there referenced by the transparent scale viewer (6) designed to exhibit contained powder (18) without distoration, reducing the risk of over and under charging a firearm such as a rifle. The powder cavity (19) within the body (5) being first ingested with powder (18) to a particular predetermined amount as therealong desired by the graduated powder quantity indicators (15), hence placing the dispensing end (17) into the firearm muzzle bore until the muzzle rest (26) comes to seat against the firearm muzzle, while it is appreciated that the transparent scale viewer (6) will be held to face the operator so as to provide visable access to the contained powder (18). while said device remains in the operators hand, and with the thumb, depress the elongated closed end of the plunger rod (7) so as to maximize the entire stroke of the plunger rod (7) through the plunger rod guidehole (14) causing the carriage (9) to egress along and through the carriage guide (13) causing the inner body wall (27) to serve as a back stop forcing the contained powder (18) to drop from the carriage (9) through the passage chamber (21) from the dispensing end (17) into the breech of the firearm.

Having thus fully described the manner of construction and use of this invention, it will be appreciated herewith, that the single function of this device, a muzzle loading measuring, transporting, and dispensing device for transporting powder as used in the art of muzzle loading firearms, as can be evidenced within the accompanying drawings appertaining hereto that may be construed as descriptive, but not in a limiting sense. While it has been necessary from time to time to mention that which has been determined as old, or what exists as prior related art apart from what is herein claimed, and wherein the mention of certain steps and procedures of prior art that are prevalent to accomplish its purpose further discloses the importance of what is herein claimed. And in doing so, it has been fundamental to further mention certain parts and mode of operation which is not herein claimed, or the same being similar to what has been before claimed.

What is claimed is:

1. A muzzle loading, measuring, transporting, and dispensing device for use with muzzle loading firearms, such as rifles, pistols, and shotguns, comprising: an elongated cylinderical open-ended body for receiving from ten to one hundred ninty grains of powder; a transparent scale viewer in said cylinderical body for measuring and viewing powder contained therein without distortion; a plunger rod having a carriage member thereon to capture and release the powder contained within the cylinderical body; and said plunger rod having an opening at one end thereof for receiving and holding a nipple pick.

2. A muzzle loading device as claimed in claim 1 wherein a powder receiving chamber is formed between a first receiving end of said cylinderical body and said carriage member for containing from ten to one hundred ninty grains of powder.

3. A muzzle loading device as claimed in claim 2 wherein said transparent scale viewer is encased in said cylinderical body to exhibit powder contained therein.

4. A muzzle loading device as claimed in claim 3 wherein said transparent scale viewer has graduated powder quantity indicators thereon to measure the amount of powder contained within said powder chamber in said cylinderical body.

5. A muzzle loading device as claimed in claim 4 wherein a second end of said cylinderical body is insertable in a firearm muzzle bore to dispense powder contained in said powder chamber into said bore.

6. A muzzle loading device as claimed in claim 5 wherein said plunger rod comprises an elongated rod perpendicular to said elongated cylinderical body; said rod extending through and away from said cylinderical body adjacent said transparent scale viewer; said rod being biased away from said body by a spring such that said powder chamber is closed to retain powder therein, and upon depression of said plunger rod against the bias of said spring, said powder chamber is opened allowing powder therein to be dispensed from said device.

7. A muzzle loading device as claimed in claim 6 wherein said elongated plunger rod has a closed end thereon threaded to receive a thumb screw; and said spring being restrained between said thumb screw and said cylinderical body; and said plunger rod opening extending to said closed end thereof and being threaded to receive a second thumb screw carrying said nipple pick.

8. A muzzle loading device as claimed in claim 7 wherein said carriage member is mounted on said plunger rod adjacent its open end for closing said powder chamber and movable with said plunger rod exteriorly of said cylinderical body when said rod is depressed to allow powder in said powder chamber to be released.

9. A muzzle loading device as claimed in claim 8 wherein said carriage member slides in horizontal slots in said cylinderical body and when said first thumb screw is loosened and said plunger rod is depressed, said carriage member extends completely outside said cylinderical body such that if said carriage member is rotated from its horizontal alingment with said slots said carriage member is retained and the device serves as a funneling device.

* * * * *